(No Model.)
S. W. HALLOCK.
BACK WATER TRAP AND VALVE.
No. 526,649. Patented Sept. 25, 1894.
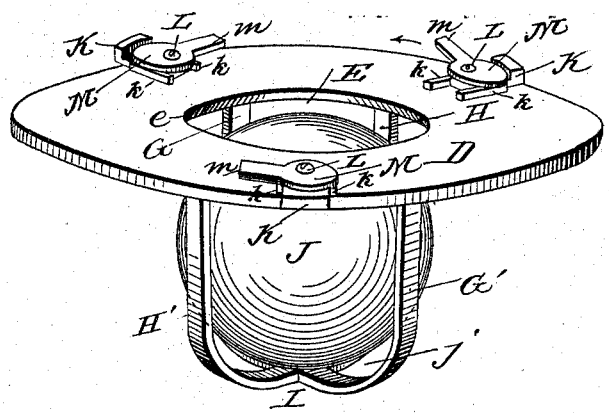
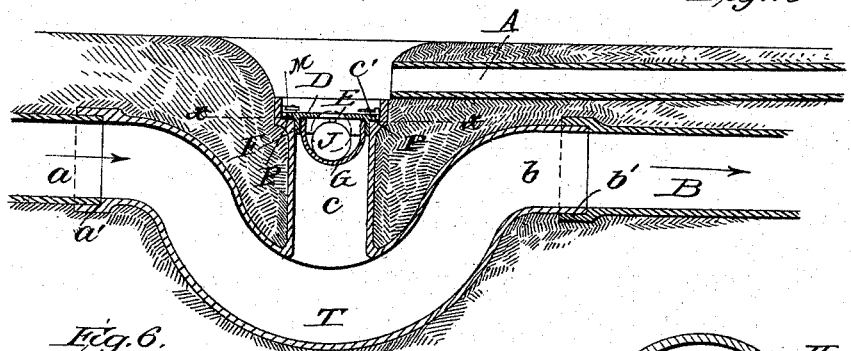
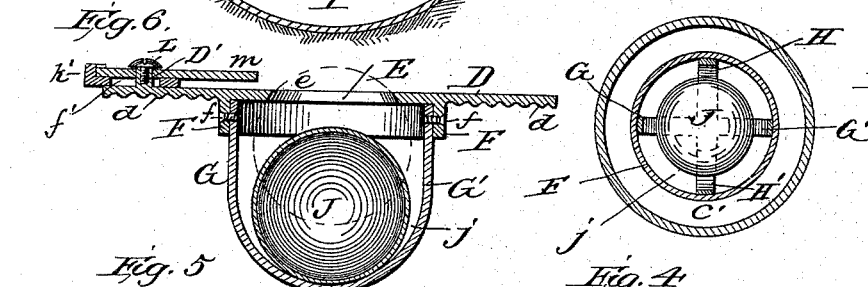
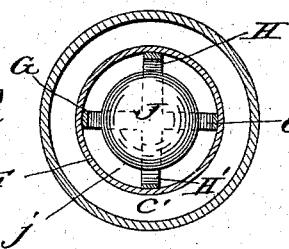
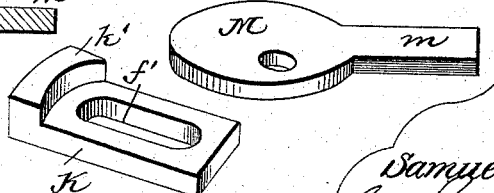
Witnesses:
F. L. Ouraud
W. D. Coombs
Inventor:
Samuel W. Hallock
Louis Bagger & Co.
Attorneys.

UNITED STATES PATENT OFFICE.

SAMUEL W. HALLOCK, OF OSHKOSH, WISCONSIN.

BACKWATER TRAP AND VALVE.

SPECIFICATION forming part of Letters Patent No. 526,649, dated September 25, 1894.

Application filed March 24, 1894. Serial No. 504,956. (No model.)

*To all whom it may concern:*

Be it known that I, SAMUEL W. HALLOCK, a citizen of the United States, and a resident of Oshkosh, in the county of Winnebago and State of Wisconsin, have invented certain new and useful Improvements in Backwater Traps and Valves; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of the cage, cage-plate and valve appertaining to my improved back-water trap and valve. Fig. 2 is a longitudinal sectional view of the same, through the center of the hollow spherical valve or float; showing the device inserted into the trap. Fig. 3 is a sectional view through the trap, on the horizontal plane indicated by the broken line marked $x$—$x$ in Fig. 2. Fig. 4 is a detail view of one of the fastening devices showing the component parts separated from one another; and Fig. 5 is a sectional detail view of the same with its parts put together, on a large scale, so as to illustrate more clearly how the valve-plate is fastened, removably, in the trap. Fig. 6 is a longitudinal section of the cage and valve.

Like letters of reference designate corresponding parts in all the figures.

This invention relates to devices for preventing the inflow of water and sewage through the drains or sewer pipes leading from the cellars or basements of houses into the sewer, and has for its object to construct a simple and inexpensive, yet strong and durable, trap and valve, adapted to be located at the connection between the main house drains and the branch sewer-pipe, or main sewer, into which this discharges; and my improvement consists in the novel and specific construction and combination of parts of a device of that type, and for that purpose, as will be hereinafter more fully described and claimed.

On the accompanying drawings, the letter T denotes a three-branch sewer-trap of the ordinary construction, made of cast-iron, stoneware, or other suitable material, and comprising the inlet $a$, outlet $b$, and handhole or middle-branch $c$. The inlet and handhole are, each, provided with a shoulder, shown, respectively, at $a'$ and $c'$, for the insertion and water-tight packing of the house drain A and valve-plate D; while the outlet $b$ is fitted into the flanged and shouldered mouth $b'$ of a pipe B, which leads to the sewer. (Not shown.)

Resting upon the rim or shoulder $c'$ of the vertical branch $c$ is a circular plate D, having a central circular aperture E, with a beveled edge $e$. An annular flange, F, depends from plate D, concentric with the central aperture; and that part of plate D between flange F and the outer rim is provided, on its under side, with a number of concentric ribs or corrugations $d$ $d$.

To the inner side of the depending flange F are fastened, by screws $f f$, the upper ends of four arms, G G' and H H'; said arms abutting with their upper ends upon the under side of plate D, and crossing, in pairs, at right angles at I, so as to form a cage depending from plate D, below its circular aperture E. This cage is of such a size and depth that the spherical valve or ball J, confined within, will have slight lateral play, and, when it rests on the bottom I of the cage, leaves an annular inlet or opening, $j$, around it, below the aperture in the plate, through which water may enter the trap through the inlet C.

When valve J rises, so as to rest itself against the under side of plate D, the beveled rim $e$ of the central aperture will form a closely fitting seat for a segment of the valve, as represented in dotted lines in Fig. 2, so as to close tightly the aperture or opening E from the under side. I prefer to make the spherical valve J of rubber and hollow; but, if desired, it may be made of copper, zinc, celluloid, or any other material adapted for the purpose.

Upon the upper flat side of plate D, near its periphery, are placed the fastening devices for holding it in its proper position in the trap. These are all constructed alike, so that the description of one will suffice for all. Each of these fasteners consists of a slidable plate K, which slides between parallel ways $k$, $k$, cast upon plate D, and has a slot $f'$ and raised curved end flange or abutment $k'$. Through the slot $f'$ is inserted a headed screw L, which is screwed into a screw-threaded socket D', cast upon plate D, so that the projecting head of the screw will overlap the slot on both sides, in such manner that the slotted plate K may slide forward and back upon the socket D'; it being confined loosely between plate D and a cam or eccentric M, which is pivoted upon the threaded socket below the screw-head, and has a shank or finger-piece m for turning it. This cam M is pivoted or fulcrumed eccentrically upon the threaded socket or pintle D', and is held in place by the overlapping screw-head, so that by turning the finger-piece m in the direction of the arrow, the rim of the cam, bearing against the raised flange or abutment k' at the outer end of the slotted plate, will push this outward from the rim or periphery of plate D, up against the flange of the shoulder c', on which the rim of the plate is supported. Thus it will be seen that by having three of these fastening-devices, each comprising a slotted plate K, interiorly threaded pintle D', screw L, and cam or eccentric M, placed equidistant from one another, three bearing points or joints of fastening, are provided for plate D, and its attachments, within the hand-hole of the trap, at the point where the cellar-drain C empties into the trap; thus holding the plate firmly in position, and yet in such a manner that it can readily be removed when desired. To disengage the friction plate K k' from the hand-hole of the trap, all that is necessary is to insert the hand into the hand-hole or inlet C, and press the finger-piece m of each cam back, i. e., pushing its free end in the direction of the periphery of plate D, which will withdraw the head of the cam from the abutment-flange k', so that plate K may be slid back and thus be released from the flange of the hand-hole, after which plate D with its appurtenances can easily be lifted off and removed.

To make a water-tight joint between plate D and the shoulder c' of the hand-hole (or middle branch c), a layer of putty, P, is placed upon the annular shoulder, and the circular, concentric corrugations d d on the under side of plate D are embedded in it; thus making a solid and absolutely water-tight joint, without the aid of rubber gaskets and packing of any kind.

In practice, the house drain discharges into the trap T through pipe A, and out through the outlet b and pipe B into the sewer. The cellar and basement drains, however, discharge into the trap and sewer through the hand-hole C; valve J, normally occupying the position shown in full-line on the drawings, i. e., resting on the bottom of its cage formed by the crossing arms G G' and H H'; but when, from any reason, the sewage backs into pipe B from the sewer, with a tendency to back up into the cellar and other low-lying parts of the house, which are drained through the hand-hole, this will be closed by valve J seating itself, from the pressure of the in-backing water, against its beveled seat e, and thus close the aperture E from the under side. The upper inlets to the main drain A are too high up, in buildings as ordinarily constructed and of the character for which my improvement is contemplated for use, to be affected by the back-flow from the sewer; but the upper terminal of, or inlet to, the cellar drain C may be so low that the back-water or sewage would escape through it at the top, unless means are provided for preventing it. This I do by means of this device, in combination with the three-branch trap; and the greater the pressure of the back-water from the sewer, the more firmly will the valve be closed. By making this hollow and of rubber, it will not only act as a float, so as to be floated or raised by its buoyancy up against its seat in plate D as the backwater rises in the trap; but, being soft and yielding, it will conform to the shape of the beveled circular seat e in such a manner as to make a perfectly water-tight joint or closure. The moment the water flows back into the sewer and pressure against the valve ceases, this will drop back, by its own gravity, into its normal, open, position in the bottom of the cage, thus re-establishing communication between the sewer, the trap, and the cellar-drain.

Having thus described my invention, I claim and desire to secure by Letters Patent of the United States—

The combination with the three branch trap T, having central shouldered hand hole C, c, the valve plate D corrugated concentrically on its under side and formed with the central circular beveled aperture E and concentric depending flange F, of the cage consisting of the four arms G, G, the upper ends of which are secured to said flange and crossing in pairs at right angles, the spherical valve seated in said cage, the equidistant slidable clamping plates K and rotatable finger pieces m, substantially as described.

In testimony that I claim the foregoing as my own I have hereunto affixed my signature in presence of two witnesses.

SAMUEL W. HALLOCK.

Witnesses:
CLARENCE D. McFARLAND,
CHARLES H. FORWARD.